United States Patent
Lim et al.

(10) Patent No.: US 11,823,688 B2
(45) Date of Patent: Nov. 21, 2023

(54) AUDIO SIGNAL ENCODING AND DECODING METHOD, AND ENCODER AND DECODER PERFORMING THE METHODS

(71) Applicants: ELECTRONICS AND TELECOMMUNICATIONS RESEARCH INSTITUTE, Daejeon (KR); The Trustees of Indiana University, Indianapolis, IN (US)

(72) Inventors: Woo-taek Lim, Daejeon (KR); Seung Kwon Beack, Daejeon (KR); Jongmo Sung, Daejeon (KR); Tae Jin Lee, Daejeon (KR); Inseon Jang, Daejeon (KR); Minje Kim, Indianapolis, IN (US)

(73) Assignees: ELECTRONICS AND TELECOMMUNICATIONS RESEARCH INSTITUTE, Daejeon (KR); The Trustees of Indiana University, Indianapolis, IN (US)

( * ) Notice: Subject to any disclaimer, the term of this patent is extended or adjusted under 35 U.S.C. 154(b) by 0 days.

(21) Appl. No.: 17/390,753

(22) Filed: Jul. 30, 2021

(65) Prior Publication Data
US 2023/0038394 A1 Feb. 9, 2023

(51) Int. Cl.
*G10L 19/008* (2013.01)
*G06N 3/04* (2023.01)
(Continued)

(52) U.S. Cl.
CPC .............. *G10L 19/008* (2013.01); *G06N 3/04* (2013.01); *G10L 19/032* (2013.01)

(58) Field of Classification Search
CPC ...... G10L 19/008; G10L 19/032; G10L 19/24; G10L 19/02; G10L 19/00; G10L 19/005; G10L 19/0017; G10L 19/0208; G10L 19/0204; G10L 19/04; G10L 19/08; G10L 19/22; G10L 19/18; G10L 19/20; G10L 19/167; G06N 3/04; G06N 3/044;
(Continued)

(56) References Cited

U.S. PATENT DOCUMENTS

| 2009/0112607 A1* | 4/2009 | Ashley .................... G10L 19/24 704/500 |
| 2019/0164052 A1 | 5/2019 | Sung et al. |
| 2020/0154104 A1 | 5/2020 | Lim et al. |

OTHER PUBLICATIONS

Kai Zhen et al., "Cascaded Cross-Module Residual Learning towards Lightweight End-to-End Speech Coding", arXiv:1906.07769v4 [eess. AS], Sep. 13, 2019.

(Continued)

*Primary Examiner* — Leshui Zhang (57) ABSTRACT

Disclosed are a method of encoding and decoding an audio signal and an encoder and a decoder performing the method. The method of encoding an audio signal includes identifying an input signal, and generating a bitstring of each encoding layer by applying, to the input signal, an encoding model including a plurality of successive encoding layers that encodes the input signal, in which a current encoding layer among the encoding layers is trained to generate a bitstring of the current encoding layer by encoding an encoded signal which is a signal encoded in a previous encoding layer and quantizing an encoded signal which is a signal encoded in the current encoding layer.

12 Claims, 4 Drawing Sheets

(51) Int. Cl.
*G10L 19/032* (2013.01)
*G10L 19/24* (2013.01)

(58) Field of Classification Search
CPC .. G06N 3/0455; G06N 3/0464; G06N 3/0495; G06N 3/082; G06N 3/084
USPC ........ 704/500–504, 202, 232, 259; 381/1–23
See application file for complete search history.

(56) References Cited

OTHER PUBLICATIONS

Daniel Stoller et al., "Wave-u-net: A multi-scale neural network for end-to-end audio source separation", arXiv preprint arXiv:1806.03185, Jun. 8, 2018.

Ke Chen, et al. "The effect of explicit structure encoding of deep neural networks for symbolic music generation." 2019 International Workshop on Multilayer Music Representation and Processing (MMRP), Jan. 24, 2019, IEEE.

* cited by examiner

AUDIO SIGNAL ENCODING AND DECODING METHOD, AND ENCODER AND DECODER PERFORMING THE METHODS

TECHNICAL FIELD

One or more example embodiments relate to a method of encoding and decoding an audio signal and an encoder and a decoder performing the method, and more particularly, to a technology for transferring an encoded signal output from each layer to a decoder for decoding using a neural network model in an autoencoder structure, thereby increasing a coding quality.

BACKGROUND ART

Deep learning, which is one of the active technical fields on which research is ongoing, has further applied to an audio-coding technology. An autoencoder, a representative example of this application, is used to handle audio signal encoding and decoding processes.

The autoencoder is provided in a structure that includes an encoding model and a decoding model, and both the encoding and decoding models are neural network models. The encoding model may transform an audio signal into a bitstring or a potential code, and the decoding model may reconstruct the original audio signal from the bitstring.

An encoding model of an existing autoencoder may include a plurality of layers that encodes an audio signal. Each of the layers may perform an encoding operation on the audio signal. The encoding operation may be performed repeatedly on the audio signal by the layers.

However, each time the encoding operation is performed, a portion of the original audio signal may be lost. Thus, it may not be easy for the decoding model to obtain a high-quality audio signal when reconstructing the original audio signal based on the bitstring that is finally generated through the encoding operation repeatedly performed a plural number of times in the encoding model. Thus, there is a desire for a technology for reconstructing an audio signal with a high quality.

DISCLOSURE

Technical Goals

An aspect provides a method and apparatus for performing encoding and quantization separately for each layer when performing audio coding using a neural network model of an autoencoder structure, thereby increasing the quality of reconstruction of an audio signal.

Technical Solutions

According to an example embodiment, there is provided a method of encoding an audio signal, the method including identifying an input signal, and generating a bitstring of each encoding layer by applying, to the input signal, an encoding model including a plurality of successive encoding layers that encodes the input signal. A current encoding layer among the encoding layers may be trained to generate a bitstring of the current encoding layer by encoding an encoded signal which is a signal encoded in a previous encoding layer among the encoding layers and quantizing an encoded signal which is a signal encoded in the current encoding layer.

The current encoding layer may generate a compressed signal by encoding the encoded signal which is the signal encoded in the previous encoding layer, and generate the bitstring of the current encoding layer by quantizing the compressed signal.

Respective bitstrings of the encoding layers may be decoded in decoding layers of a decoding model respectively corresponding to the encoding layers. The decoding layers may respectively correspond to the encoding layers.

The method may further include generating a bitstream by combining the bitstrings of the encoding layers.

According to another example embodiment, there is provided a method of decoding an audio signal, the method including identifying a bitstring of each encoding layer generated by an encoder, and generating an output signal by inputting the bitstring of each encoding layer to a decoding model including a plurality of successive decoding layers that decodes the bitstring of each encoding layer. A current decoding layer among the decoding layers may be trained to decode a decoded signal which is a signal decoded in a previous decoding layer among the decoding layers, using a bitstring of an encoding layer corresponding to the current decoding layer among respective bitstrings of encoding layers of the encoder.

The current decoding layer may dequantize the bitstring of the encoding layer corresponding to the current decoding layer among the bitstrings of the encoding layers, and decode the decoded signal which is the signal decoded in the previous decoding layer to be the same as the dequantized bitstring.

The bitstring of the encoding layer corresponding to the current decoding layer among the bitstrings of the encoding layers may be the same in size or channel as the decoded signal which is the signal decoded in the previous decoding layer.

The bitstrings of the encoding layers may be generated by being encoded and quantized in different encoding layers by an encoding model.

The bitstrings of the encoding layers may have different sizes or different channels.

According to still another example embodiment, there is provided an encoder configured to perform a method of encoding an audio signal, the encoder including a processor. The processor may identify an input signal, and generate a bitstring of each encoding layer by applying, to the input signal, an encoding model including a plurality of successive encoding layers that encodes the input signal. A current encoding layer among the encoding layers may be trained to generate a bitstring of the current encoding layer by encoding an encoded signal which is a signal encoded in a previous encoding layer among the encoding layers, and quantizing an encoded signal which is a signal encoded in the current encoding layer.

The current encoding layer may generate a compressed signal by encoding the encoded signal which is the signal encoded in the previous encoding layer, and generate the bitstring of the current encoding layer by quantizing the compressed signal.

Respective bitstrings of the encoding layers may be decoded in decoding layers of a decoding model respectively corresponding to the encoding layers. The decoding layers may respectively correspond to the encoding layers.

The processor may generate a bitstream by combining the bitstrings of the encoding layers.

According to yet another example embodiment, there is provided a decoder configured to perform a method of decoding an audio signal, the decoder including a processor.

The processor may identify a bitstring of each encoding layer generated by an encoder, and generate an output signal by inputting the bitstring of each encoding layer to a decoding model including a plurality of successive decoding layers that decodes the bitstring of each encoding layer. A current decoding layer among the decoding layers may be trained to decode a decoded signal which is a signal decoded in a previous decoding layer among the decoding layers, using a bitstring of an encoding layer corresponding to the current decoding layer among respective bitstrings of encoding layers of the encoder.

The current decoding layer may dequantize the bitstring of the encoding layer corresponding to the current decoding layer among the bitstrings of the encoding layers, and decode the decoded signal which is the signal decoded in the previous decoding layer to be the same as the dequantized bitstring.

The bitstring of the encoding layer corresponding to the current decoding layer among the bitstrings of the encoding layers may be the same in size or channel as the decoded signal which is the signal decoded in the previous decoding layer.

The bitstrings of the encoding layers may be generated by being encoded and quantized in different encoding layers by an encoding model.

The bitstrings of the encoding layers may have different sizes or different channels.

Advantageous Effects

According to example embodiments described herein, it is possible to increase the quality of reconstruction of an audio signal by processing encoding and quantization separately in each layer to perform audio coding using a neural network model of an autoencoder structure. In addition, it is possible to improve the cognitive quality of a restructured audio signal by using the neural network model.

BEST MODE FOR CARRYING OUT THE INVENTION

Hereinafter, example embodiments will be described in detail with reference to the accompanying drawings. However, various alterations and modifications may be made to the examples. Here, the examples are not construed as limited to the disclosure and should be understood to include all changes, equivalents, and replacements within the idea and the technical scope of the disclosure.

The terminology used herein is for the purpose of describing only particular examples and is not to be limiting of the examples. As used herein, the singular forms "a," "an," and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms, including technical and scientific terms, used herein have the same meaning as commonly understood by one of ordinary skill in the art to which this disclosure pertains consistent with and after an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

Also, in the description of example embodiments, detailed description of structures or functions that are thereby known after an understanding of the disclosure of the present application will be omitted when it is deemed that such description will cause ambiguous interpretation of the example embodiments. Hereinafter, example embodiments will be described in detail with reference to the accompanying drawings, and like reference numerals in the drawings refer to like elements throughout.

Figure 1:
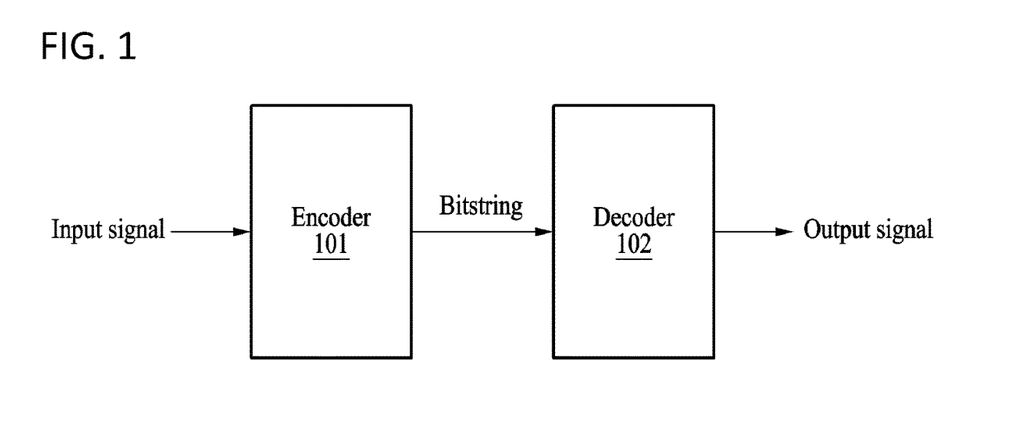
FIG. 1 is a diagram illustrating an example of an encoder and an example of a decoder according to an example embodiment.

FIG. 1 is a diagram illustrating an example of an encoder and an example of a decoder according to an example embodiment.

The present disclosure relates to a technology for generating a bitstring of each encoding layer when encoding and decoding an audio signal using a neural network model of an autoencoder structure and transferring the generated bitstring to a decoder, thereby increasing the quality of reconstruction of the audio signal.

Referring to FIG. 1, an encoder 101 may generate a bitstring by encoding an input signal, and a decoder 102 may generate an output signal by decoding the bitstring. The encoder 101 and the decoder 102 may include a processor, respectively. For example, the encoder 101 and the decoder 102 may be the same electronic device.

The processor included in the encoder 101 may perform an encoding method described herein according to an example embodiment. The processor included in the decoder 102 may perform a decoding method described herein according to an example embodiment. The operations to be processed by a neural network model used herein may all be performed by the processor included in the encoder 101 or the decoder 102.

The input signal may be an original audio signal to be encoded and decoded, and the output signal may be an audio signal to be reconstructed.

The neural network model used herein may be a neural network model based on a structure of an autoencoder and include an encoding model and a decoding model. For example, as the neural network model, various types of neural network models, for example, a convolutional neural network (CNN), a recurrent neural network (RNN), and the like may be used.

For example, the neural network model may be trained based on a difference between the input signal and the output signal. For example, the neural network model may be trained as parameters of the neural network model are updated such that the difference between the input signal and the output signal is minimized. The neural network model may be trained such that a value of a loss function determined by the difference between the input signal and the output signal is minimized. For example, backpropagation may be used to train the neural network model.

The encoding model included in the neural network model may encode the input signal to generate a bitstring for each encoding layer. The encoding model may include a plurality of successive encoding layers that encodes the input signal. The input signal may pass through the encoding layers in sequential order to be encoded therethrough.

Each of the encoding layers may perform an operation of the same encoding function. Each of the encoding layers may include parameters for the operation of the encoding function. The encoding function is not limited to a specific example. For example, a convolution operation may be performed in the encoding layers. For example, input data of an encoding layer may be output data of a previous encoding layer.

That is, a current encoding layer among the encoding layers may encode a signal that is encoded in a previous encoding layer among the encoding layers. For example, output data of an encoding layer may be a feature map including feature vectors. For example, in the encoding layers, the size of input data may decrease, and the channel or dimension of the input data may increase.

The decoding model may generate the output signal by decoding the bitstring of each of the encoding layers. The decoding model may include a plurality of successive decoding layers that decodes the bitstring. The bitstring may pass through the decoding layers in sequential order to be decoded therethrough. For example, in the decoding layers, the size of input data may increase, and the channel or dimension may decrease.

Each of the decoding layers may perform an operation of the same decoding function. The decoding function may be determined in association with the encoding function. The decoding function is not limited to a specific example. Each of the decoding layers may include parameters for the operation of the decoding function. An example of the neural network models of the autoencoder structure will be described hereinafter with reference to FIG. 2.

According to an example embodiment, a skip connection may be performed on the encoding layers in an encoding process performed by the encoding model. However, separate encoding and quantization processes may be performed by each encoding layer in a process of the skip connection, and a bitstring may be generated for each encoding layer.

For example, a current encoding layer may encode a previously encoded signal which is a signal encoded in a previous encoding layer, and quantize a currently encoded signal which is a signal obtained by the encoding by the current encoding layer to generate a bitstring of the currently encoded signal.

A decoding layer of the decoding model may perform decoding using a bitstring of a corresponding encoding layer, and it is thus possible to increase the quality of a decoded audio signal. In addition, a separate encoding and quantization process may be performed in each encoding layer in the process of generating a bitstring by each encoding layer, and it is thus possible to increase compression efficiency.

Figure 2:
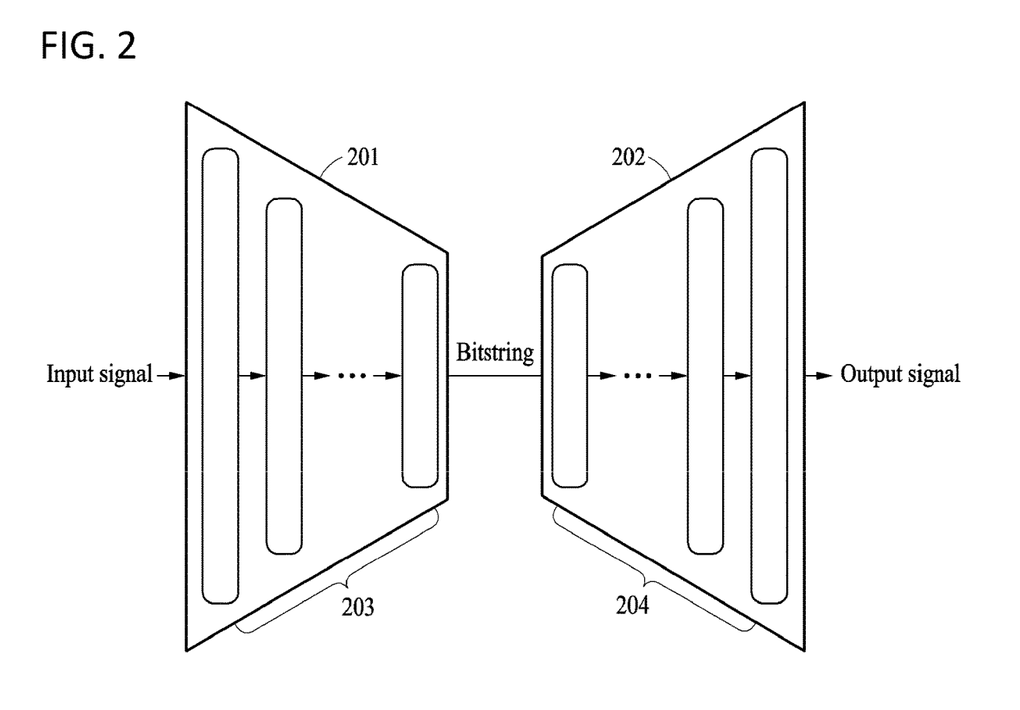
FIG. 2 is a diagram illustrating an example of a structure of an autoencoder-based neural network model.

FIG. 2 is a diagram illustrating an example of a structure of an autoencoder-based neural network model.

Referring to FIG. 2, an encoding model 201 included in an existing autoencoder-based neural network model may include a plurality of successive encoding layers 203. An input signal may be encoded into a bitstring after passing through the encoding layers 203. For example, the input signal may be encoded sequentially by the encoding layers 203.

For example, the bitstring of the encoding model 201 may be determined based on Equation 1 below.

$$z \leftarrow \mathcal{F}_{enc}(x) = f_{enc}^{(L)} \circ f_{enc}^{(L-1)} \circ \ldots \circ f_{enc}^{(3)} \circ f_{enc}^{(2)} \circ f_{enc}^{(1)}(x) \quad \text{[Equation 1]}$$

In Equation 1 above, z denotes a bitstring generated by the encoding model 201. $F_{enc}(x)$ denotes a function of an operation processed in the encoding model 201. $f_{enc}^{(i)}$ denotes an encoding function of an ith encoding layer 203. L denotes a total number of encoding layers 203. x denotes an input signal.

Referring to FIG. 2, a decoding model 202 included in the existing autoencoder-based neural network model may include a plurality of successive decoding layers 204. The decoding model 202 may generate an output signal by decoding the bitstring. For example, the bitstring may be decoded sequentially by the decoding layers 204.

For example, the output signal may be generated in the decoding model 202 based on Equation 2 below.

$$x \approx \bar{x} \leftarrow \mathcal{F}_{dec}(x) = f_{dec}^{(L)} \circ f_{dec}^{(L-1)} \circ \ldots \circ f_{dec}^{(3)} \circ f_{dec}^{(2)} \circ f_{dec}^{(1)}(\bar{x}^{(L)}) \quad \text{[Equation 2]}$$

In Equation 2, $\bar{x}$ denotes an output signal generated by the decoding model 202, and x denotes an input signal. $\bar{x}^{(L)}$ denotes a signal obtained by dequantizing a bitstring generated by the encoding model 201. $F_{dec}(x)$ denotes a function of an operation processed in the decoding model 202. $f_{dec}^{(i)}$ denotes a decoding function of an ith decoding layer 204. L denotes a total number of decoding layers 204.

Referring to FIG. 2, the decoding layers 204 and the encoding layers 203 may respectively correspond to each other.

For example, input data (or an input signal) of a first encoding layer 203 that encodes the input signal and output data (or an output signal) of a final decoding layer 204 of the decoding model 202 that generates the output signal are the same in size and dimension, and thus the first encoding layer 203 encoding the input signal may correspond to the final decoding layer 204 generating the output signal.

In an encoding and decoding process performed by the existing autoencoder-based neural network model illustrated in FIG. 2, a portion of an original audio signal may be lost each time an encoding operation is performed. Thus, it may not be easy to obtain a high-quality audio signal in a process of reconstructing an audio signal.

According to an example embodiment, an encoder described herein may generate a bitstring for each encoding layer and a decoder described herein may perform decoding using the bitstring, and it is thus possible to increase the quality of an audio signal to be reconstructed. In addition, the encoder may perform separate encoding and quantization processes while generating the bitstring for each encoding layer, and it is thus possible to increase the compression efficiency.

Figure 3:
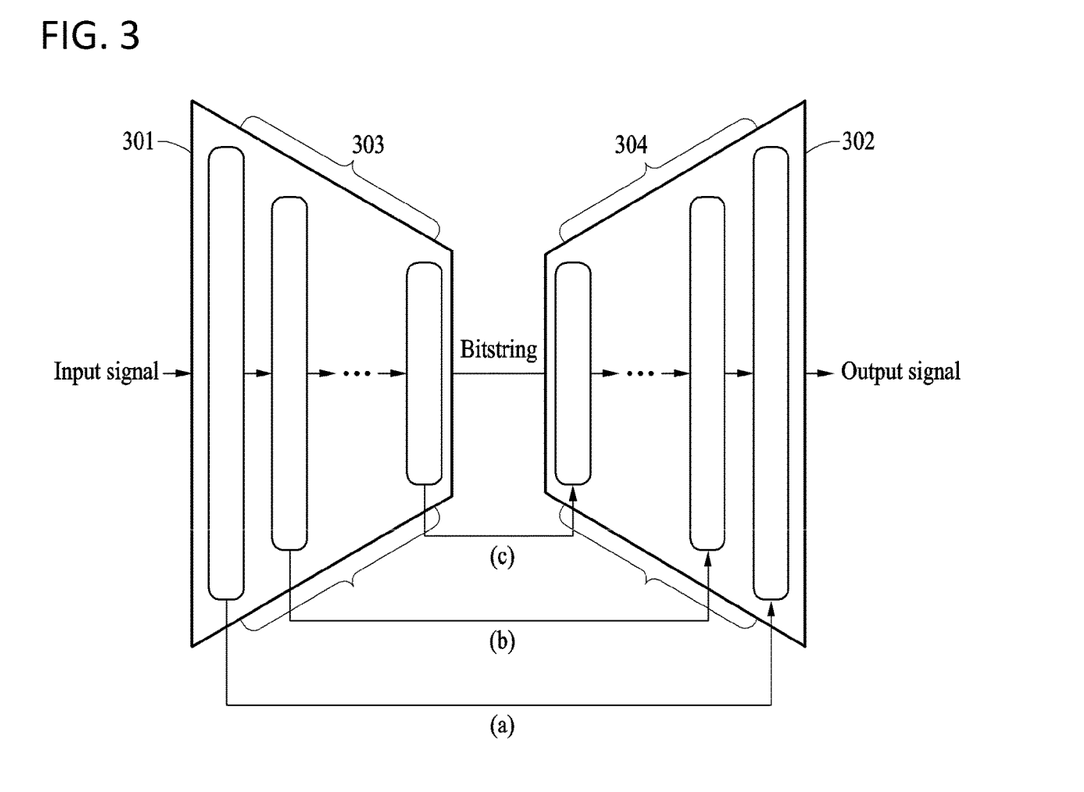
FIG. 3 is a diagram illustrating an example of a structure of an encoding model and an example of a structure of a decoding model according to an example embodiment.

FIG. 3 is a diagram illustrating an example of a structure of an encoding model and an example of a structure of a decoding model according to an example embodiment.

Referring to FIG. 3, an encoding model 301 included in a neural network model according to an example embodiment may include a plurality of successive encoding layers 303. An input signal may be encoded into a bitstring by passing through the encoding layers 303. For example, the input signal may be encoded sequentially by the encoding layers 303.

Referring to FIG. 3, through skip connections (a), (b), and (c), a bitstring generated by each of the encoding layers 303 may be decoded in a plurality of successive decoding layers 304 of a decoding model 302. Each of the skip connections may be performed on a corresponding encoding layer 303 and a corresponding decoding layer 304 that respectively correspond to each other.

Respective bitstrings of the encoding layers 303 may be encoded and quantized in different encoding layers 303 by the encoding model 301. For example, the encoding layers 303 may encode input data and perform additional encoding and quantization to generate the bitstrings.

For example, a current encoding layer 303 may additionally encode an encoded signal which is a signal encoded in a previous encoding layer 303, and quantize the encoded signal to generate a bitstring corresponding to the current encoding layer 303. The encoded signal may be the input signal encoded by the encoding layers 303.

For example, an encoding function used for such additional encoding to generate a bitstring for each encoding layer 303 may be defined as a second encoding function, and the encoding function of Equation 1 may be defined as a first encoding function.

For example, the current encoding layer 303 may encode the encoded signal obtained from the previous encoding layer 303 using the first encoding function. The encoding layers 303 may then encode the encoded signal obtained from the current encoding layer 303 and quantize the encoded signal using the second encoding function to generate a bitstring. A subsequent encoding layer 303 may encode the encoded signal which is a signal encoded by the first encoding function in the current encoding layer 303, using the first encoding function.

For another example, a skip connection may be performed only on some of the encoding layers 303. In this example, a bit rate-based scalable structure may be applied. In a process of performing the skip connection, an operation of generating a bitstring through encoding and quantization by each encoding layer 303 may be applied to various audio coding models.

Referring to FIG. 3, the decoding layers 304 and the encoding layers 303 may respectively correspond to each other.

For example, input data (or an input signal) of a first encoding layer 303 that encodes the input signal and output data (or an output signal) of a final decoding layer 304 that generates the output signal from the decoding model 302 may be the same in size and dimension, and thus the first encoding layer 303 encoding the input signal and the final decoding layer 304 generating the output signal from the decoding model 302 may correspond to each other.

For example, a bitstring of an encoding layer 303 corresponding to a current decoding layer 304 among bitstrings of the encoding layers 303 may be the same in size or channel as a decoded signal which is a signal decoded in a previous decoding layer 304.

Referring to FIG. 3, the decoding model 302 may include the plurality of successive decoding layers 304. The decoding model 302 may decode a bitstring to generate an output signal. For example, the decoding model 302 may sequentially decode the output signal using a bitstring of each of the encoding layers 303. A detailed process will be described hereinafter with reference to FIG. 4.

Figure 4:
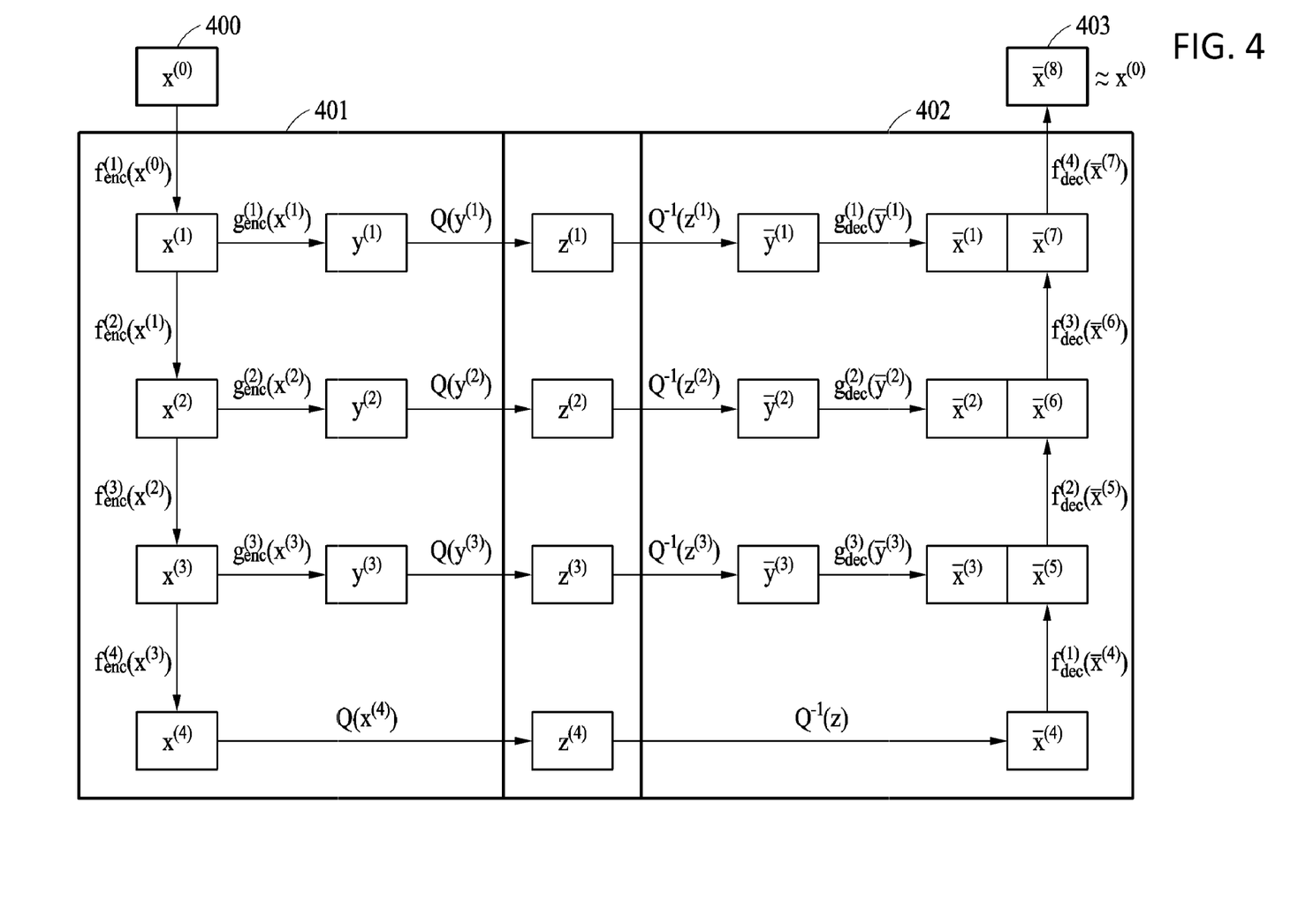
FIG. 4 is a diagram illustrating an example of data processing of an encoding model and a decoding model according to an example embodiment.

FIG. 4 is a diagram illustrating an example of data processing according to an example embodiment.

For example, referring to FIG. 4, an encoding model 401 may include four encoding layers, and a decoding model 402 may include four decoding layers. The number of encoding layers and decoding layers is not limited to the foregoing example, and may be expanded or reduced according to examples. Referring to FIG. 4, the first to fourth encoding layers may respectively correspond to the fourth to seventh decoding layers.

Referring to FIG. 4, an encoder may identify an input signal $x^{(0)}$ 400. Referring to FIG. 4, $f_{enc}^{(i)}$ indicates a first encoding function used in an ith encoding layer, and $gen^{(i)}(x^{(i)})$ indicates a second encoding function used in the ith encoding layer.

$z^{(i)}$ corresponds to a bitstring of the ith encoding layer. $Q(y^{(i)})$ indicates a quantization function used in the ith encoding layer. $y^{(i)}$ indicates an encoded signal which is a signal encoded by the second encoding function in the ith encoding layer.

For example, $y^{(i)}$ may be determined based on Equation 3 below.

$$y^{(l)} \leftarrow G_{enc}^{(l)}(x^{(l)}) \qquad \text{[Equation 3]}$$

In Equation 3 above, $y^{(i)}$ denotes an encoded signal which is a signal encoded by the second encoding function in an lth encoding layer. In Equation 3, $g_{enc}^{(i)}(x^{(i)})$ denotes the second encoding function used in the lth encoding layer. $x^{(i)}$ denotes an encoded signal which is a signal encoded by the first encoding function in the lth encoding layer.

For example, referring to FIG. 4, a current encoding layer, for example, the second encoding layer, may encode an encoded signal x(which is a signal encoded in a previous encoding layer, for example, the first encoding layer, using a first encoding function $f_{enc}^{(2)}$. In this example, the current encoding may encode an encoded signal $x^{(2)}$ which is a signal encoded in the current encoding layer, using a second encoding function $g_{enc}^{(2)}$, and quantize the encoded signal to generate a bitstring z(corresponding to the current encoding layer.

A decoder may identify bitstrings z(to z(of the encoding layers generated by the encoder. Referring to FIG. 4, in the decoding model 402, $f_{dec}^{(i)}$ may indicate a first decoding function used in an ith decoding layer. The first decoding function may be a decoding function corresponding to the first encoding function. $g_{dec}^{(i)}$ may indicate a second decoding function used in the ith decoding layer. The second decoding function may be a decoding function corresponding to the second encoding function.

In FIG. 4, a bitstring of the fourth encoding layer may be decoded by passing through the fourth to seventh decoding layers. Referring to FIG. 4, $\bar{x}^{(4)}$-$\bar{x}^{(7)}$ may indicate decoded signals which are signals decoded by the first decoding function in the fourth to seventh decoding layers. A decoded signal may be a decoded bitstring.

$\bar{x}^{(1)}$-$\bar{x}^{(3)}$ may indicate that encoded signals corresponding to bitstrings of the first to third encoding layers are reconstructed in the decoding layers. $Q^{-1}(y^{(i)})$ may indicate an inverse function of a quantization function used in an ith encoding layer. j may indicate that an encoded signal which is a signal encoded by the second encoding function in the ith encoding layer is reconstructed.

For example, according to Equation 4 below, the encoded signals corresponding to the bitstrings of the first to third encoding layers may be reconstructed in the decoding layers.

$$x^{(l)} \approx \bar{x}^{(l)} \leftarrow G_{dec}^{(l)}(\bar{y}^{(l)}) \qquad \text{[Equation 4]}$$

In Equation 4 above, $g_{dec}^{(l)}$ denotes the second decoding function used in an lth decoding layer. $\bar{y}^{(l)}$ may indicate that an encoded signal which is a signal encoded by the second encoding function in the lth encoding layer is reconstructed. $\bar{x}^{(l)}$ may indicate that the encoded signal corresponding to a bitstring of the lth encoding layer is reconstructed in the decoding layers. $x^{(l)}$ denotes an original audio signal or encoded signal.

For example, a current decoding layer (e.g., the sixth decoding layer) among the decoding layers may decode a decoded signal $\bar{x}^{(5)}$ which is a signal decoded in a previous decoding layer (e.g., the fifth encoding layer), using a bitstring $z^{(2)}$ of an encoding layer (e.g., the second decoding layer) corresponding to the current decoding layer among bitstrings $z^{(1)}$ to $z^{(4)}$ of the encoding layers.

For example, the current decoding layer (e.g., the sixth decoding layer) may decode the decoded signal $\bar{x}^{(5)}$ which is the signal decoded in the previous decoding layer (e.g., the fifth encoding layer), by inputting, to the first decoding function $f_{dec}^{(3)}$, a result of concatenating a decoded signal $\bar{x}^{(2)}$ which is a signal reconstructed from the bitstring $z^{(2)}$ of the encoding layer (e.g., the second decoding layer) corresponding to the current decoding layer among the bitstrings $z^{(1)}$ to $z^{(4)}$ of the encoding layers and the decoded signal $\bar{x}^{(5)}$ which is the signal decoded in the previous decoding layer (e.g., the fifth encoding layer). Through such a process described in the foregoing, the decoding model 402 may generate an output signal $\bar{x}^{(8)}$ 403.

Figure 5A:
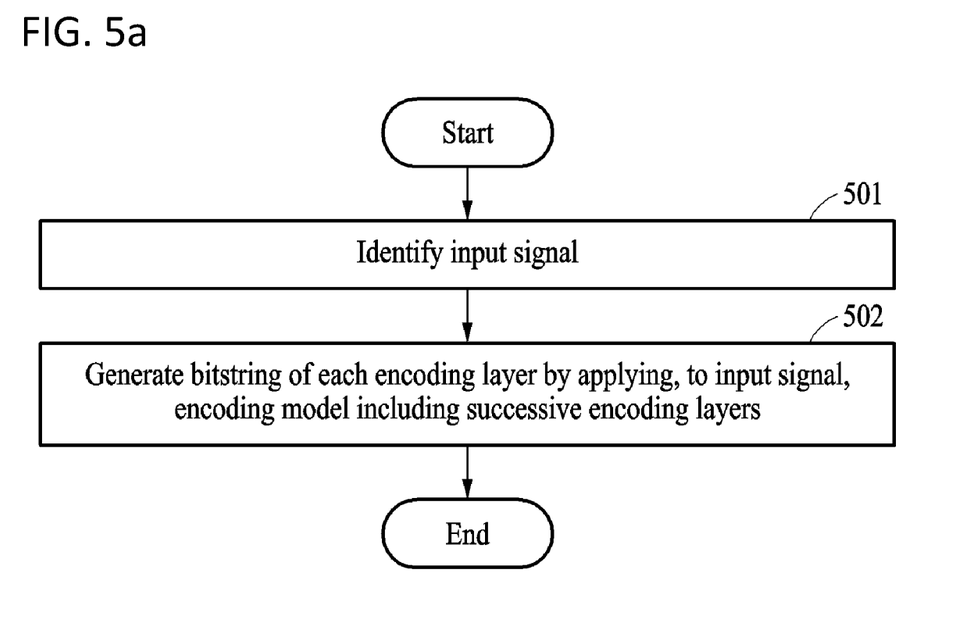
FIGS. 5*a* and 5*b* are flowcharts illustrating an example of an encoding method and an example of a decoding method according to an example embodiment.
Figure 5B:
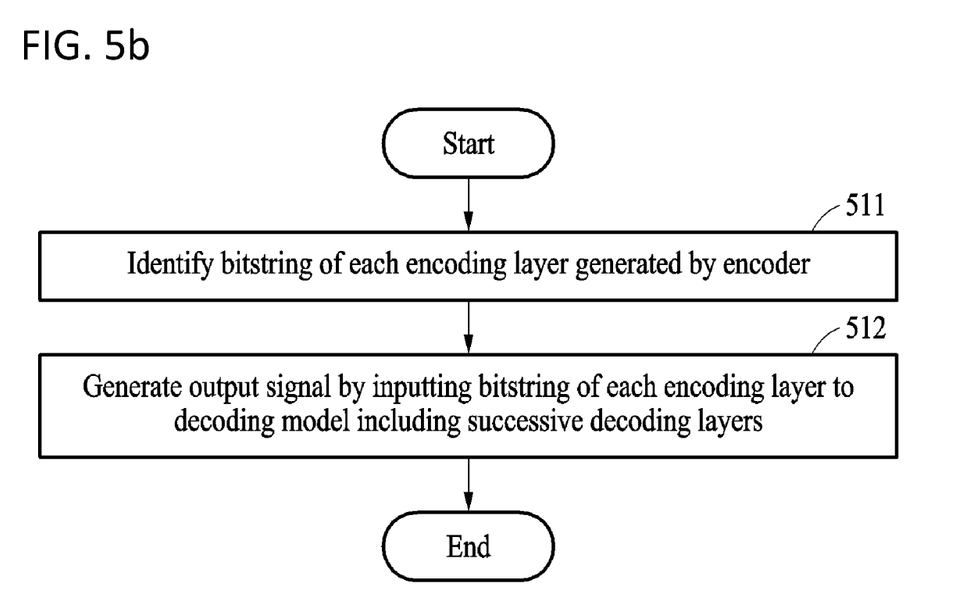

FIGS. 5a and 5b are flowcharts illustrating an example of an encoding method and an example of a decoding method according to an example embodiment.

FIG. 5a is a flowchart illustrating an example of an encoding method according to an example embodiment, and FIG. 5b is a flowchart illustrating an example of a decoding method according to an example embodiment.

In operation 501, an encoder may identify an input signal. The input signal may be an original audio signal. In operation 502, the encoder may generate a bitstring of each encoding layer by applying, to the input signal, an encoding model including a plurality of successive encoding layers that encodes the input signal.

For example, a current encoding layer among the encoding layers may encode an encoded signal which is a signal encoded in a previous encoding layer, using a first encoding function. In this example, the current encoding layer may quantize the encoded signal which is a signal encoded by the current encoding layer using a second encoding function to generate a bitstring corresponding to the current encoding layer.

In operation 511, a decoder may identify a bitstring of each of the encoding layers generated by the encoder. In operation 512, the decoder may generate an output signal by inputting the bitstring of each of the encoding layers to a decoding model including a plurality of successive decoding layers that decodes the bitstring of each of the encoding layers.

For example, a current decoding layer among the decoding layers may decode a decoded signal which is a signal decoded in a previous decoding layer by inputting, to a first decoding function, a result of concatenating a decoded signal reconstructed from a bitstring of an encoding layer corresponding to the current decoding layer among respective bitstrings of the encoding layers and a decoded signal which is a signal decoded in the previous decoding layer. Through the operations described above, the decoding model may generate the output signal.

The methods according to the above-described example embodiments may be recorded in non-transitory computer-readable media including program instructions to implement various operations of the example embodiments. The media may also be implemented as various recording media such, as, for example, a magnetic storage medium, an optical read medium, a digital storage medium, and the like.

The units described herein may be implemented using hardware components and software components. For example, the hardware components may include microphones, amplifiers, band-pass filters, audio to digital convertors, non-transitory computer memory and processing devices. A processing device may be implemented using one or more general-purpose or special purpose computers, such as, for example, a processor, a controller and an arithmetic logic unit (ALU), a digital signal processor, a microcomputer, a field programmable gate array (FPGA), a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciate that a processing device may include multiple processing elements and multiple types of processing elements. For example, a processing device may include multiple processors or a processor and a controller. In addition, different processing configurations are possible, such as parallel processors. The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network-coupled computer systems so that the software is stored and executed in a distributed fashion. The software and data may be stored by one or more non-transitory computer-readable recording mediums. The non-transitory computer-readable recording medium may include any data storage device that can store data which can be thereafter read by a computer system or processing device.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter.

The above-described devices may be configured to act as one or more software modules in order to perform the operations of the above-described example embodiments, or vice versa.

Although the specification includes the details of a plurality of specific implementations, it should not be understood that they are restricted with respect to the scope of any claimable matter. On the contrary, they should be understood as the description about features that may be specific to the specific example embodiment of a specific subject matter. Specific features that are described in this specification in the context of respective example embodiments may be implemented by being combined in a single example embodiment. On the other hand, the various features described in the context of the single example embodiment may also be implemented in a plurality of example embodiments, individually or in any suitable sub-combination. Furthermore, the features operate in a specific combination and may be described as being claimed. However, one or more features from the claimed combination may be excluded from the combination in some cases. The claimed combination may be changed to sub-combinations or the modifications of sub-combinations.

Likewise, the operations in the drawings are described in a specific order. However, it should not be understood that such operations need to be performed in the specific order or sequential order illustrated to obtain desirable results or that all illustrated operations need to be performed. In specific cases, multitasking and parallel processing may be advantageous. Moreover, the separation of the various device components of the above-described example embodiments should not be understood as requiring such the separation in all example embodiments, and it should be understood that the described program components and devices may generally be integrated together into a single software product or may be packaged into multiple software products.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Therefore, the scope of the disclosure is defined not by the detailed description, but by the claims and their equivalents, and all variations within the scope of the claims and their equivalents are to be construed as being included in the disclosure.

DESCRIPTION OF REFERENCE NUMERALS

101: Encoder
102: Decoder

The invention claimed is:

1. A method of encoding an audio signal, comprising:
identifying an input signal; and
generating a bitstring of each of a plurality of successive encoding layers by applying, to the input signal, an encoding model comprising the plurality of successive encoding layers,
wherein the plurality of successive encoding layers encodes the input signal, and
wherein a current encoding layer among the plurality of successive encoding layers is trained to generate a bitstring of the current encoding layer by encoding, using a second encoding function, a first encoded signal which is a signal generated by encoding an output of a previous encoding layer among the plurality of successive encoding layers using a first encoding function, and quantizing a second encoded signal which is a signal encoded in the current encoding layer using the second encoding function.

2. The method of claim 1, wherein the bitstrings of the plurality of successive encoding layers are decoded in a plurality of successive decoding layers of a decoding model, wherein the plurality of successive decoding layers respectively correspond to the plurality of successive encoding layers.

3. The method of claim 1, further comprising:
generating a bitstream by combining the bitstrings of the plurality of successive encoding layers.

4. A method of decoding an encoded audio signal, comprising:
identifying a bitstring of each of a plurality of successive encoding layers generated by an encoder; and
generating an output signal by inputting the bitstring of each of the plurality of successive encoding layers to a decoding model comprising a plurality of successive decoding layers,
wherein the plurality of successive decoding layers respectively decode the bitstrings of the plurality of successive encoding layers,
wherein a current decoding layer among the plurality of successive decoding layers is trained to decode a first decoded signal, which is a signal decoded in a previous decoding layer among the plurality of successive decoding layers using a first decoding function, using a second decoded signal that is a signal reconstructed, using a second decoding function, from a bitstring of an encoding layer corresponding to the current decoding layer among the bitstrings of the plurality of successive encoding layers of the encoder.

5. The method of claim 4, wherein the current decoding layer is further configured to dequantize the bitstring of the encoding layer corresponding to the current decoding layer among the bitstrings of the plurality of successive encoding layers and generate the second decoded signal by applying the second decoding function to the dequantized bitstring, and decode the first decoded signal which is the signal decoded in the previous decoding layer to correspond to the dequantized bitstring.

6. The method of claim 4, wherein the bitstring of the encoding layer corresponding to the current decoding layer among the bitstrings of the plurality of successive encoding layers is the same in size or channel as the first decoded signal which is the signal decoded in the previous decoding layer.

7. The method of claim 4, wherein the bitstrings of the plurality of successive encoding layers are generated by being encoded and quantized in different encoding layers by an encoding model.

8. The method of claim 4, wherein the bitstrings of the plurality of successive encoding layers are of different sizes or have different channels.

9. An encoder configured to perform a method of encoding an audio signal, the encoder comprising:
a processor,
wherein the processor is configured to identify an input signal, and generate a bitstring of each of a plurality of successive encoding layers by applying, to the input signal, an encoding model comprising the plurality of successive encoding layers,
wherein the plurality of successive encoding layers encode the input signal, and wherein a current encoding layer among the plurality of successive encoding layers is trained to generate a bitstring of the current encoding layer by encoding, using a second encoding function, a first encoded signal which is a signal generated by encoding an output of a previous encoding layer among the plurality of successive encoding layers using a first encoding function, and quantizing a second encoded signal which is a signal encoded in the current encoding layer using the second encoding function.

10. The method of claim 9, wherein the current encoding layer is configured to generate a compressed signal by encoding the first encoded signal, which is the signal encoded in the previous encoding layer, using the second encoding function and generate the bitstring of the current encoding layer by quantizing the compressed signal.

11. The method of claim 9, wherein the bitstrings of the plurality of successive encoding layers are decoded in a plurality of successive decoding layers of a decoding model, wherein the plurality of successive decoding layers respectively correspond to the plurality of successive encoding layers.

12. The method of claim 9, wherein the processor is configured to generate a bitstream by combining the bitstrings of the plurality of successive encoding layers.

* * * * *